May 15, 1945.  H. SINCLAIR  2,375,952

REVERSING GEARING

Filed April 3, 1942  2 Sheets-Sheet 1

Inventor
Harold Sinclair
by
Dean Fairbank & Hirsch
his Attys

May 15, 1945.  H. SINCLAIR  2,375,952
REVERSING GEARING
Filed April 3, 1942    2 Sheets-Sheet 2
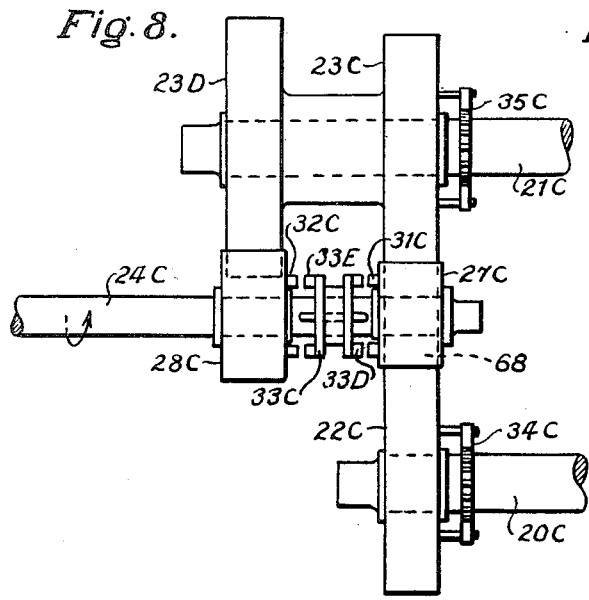
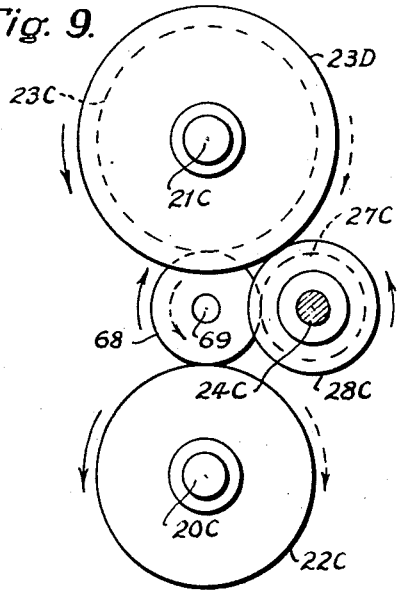
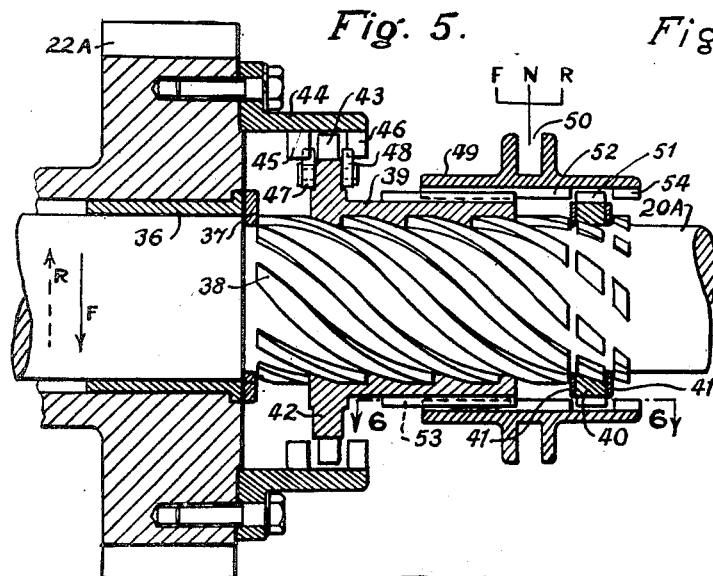
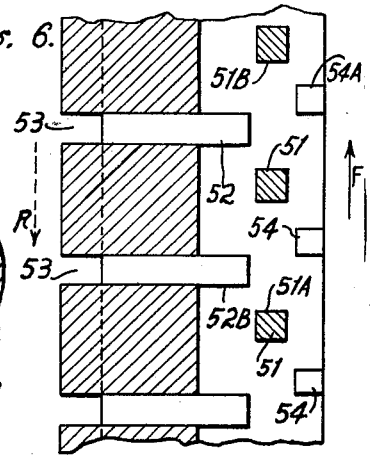
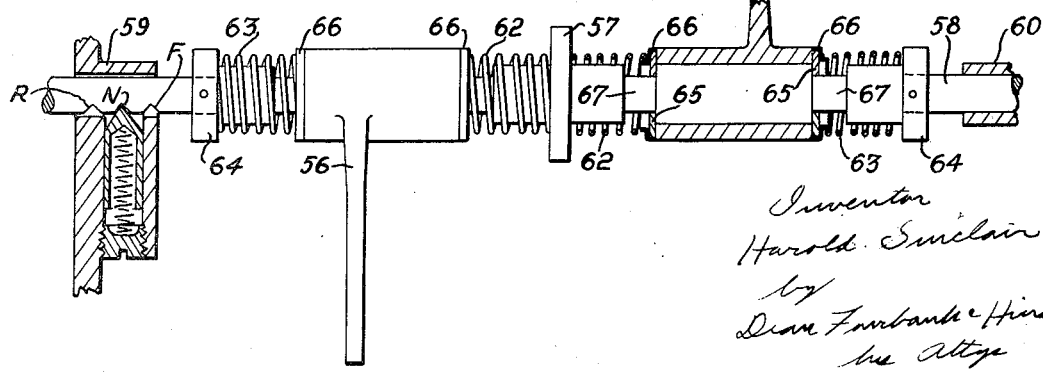
Inventor
Harold Sinclair
by
Dean Fairbank & Hirsch
his Attys Patented May 15, 1945

2,375,952

UNITED STATES PATENT OFFICE 2,375,952

REVERSING GEARING

Harold Sinclair, Kensington, London W. 8, England

Application April 3, 1942, Serial No. 437,581
In Great Britain May 24, 1941

5 Claims. (Cl. 192—3.5)

This invention relates to drive-dividing reversing gearing including three parallel shafts the first and second of which are reversible relatively to the third. The said third shaft is the input shaft and is intended to rotate always in the same direction, while the first and second shafts are the output shafts and are simultaneously reversible.

An object of the present invention is to provide such reversing gearing in which the output shafts are capable of free-wheeling independently in both directions of rotation, as is usually desirable when the gearing is used for driving a plurality of axles of a railway vehicle.

Further objects and advantages of this invention will be apparent from the following description of various embodiments thereof, given with reference to the accompanying diagrammatic drawings, in which—

Fig. 1 is a plan of an elementary form of the improved drive-dividing and reversing gearing, Fig. 2 shows the same gearing, as seen from the left-hand end of Fig. 1, Fig. 3 is a plan of a modification of the gearing shown in Fig. 1, Fig. 4 is an end view of this modification, Fig. 5 is a sectional plan of a coupling in the gearing shown in Figs. 1 to 4, Fig. 6 is a development on the line 6—6 in Fig. 5.

Fig. 7 is a plan of control mechanism for the gearing shown in Figs. 3 to 6,

Fig. 8 is a plan of a further alternative arrangement of the improved gearing, and Fig. 9 shows this last arrangement in end elevation.

Figure 1:
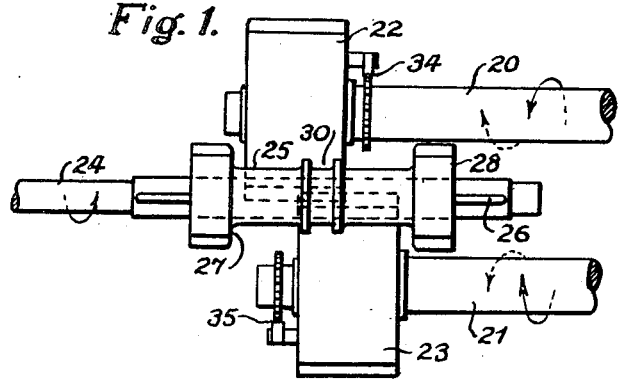
Figure 2:
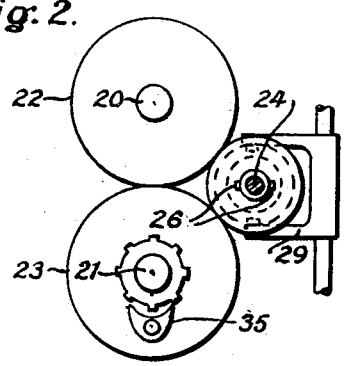

Referring to Figs. 1 and 2, on the two parallel output shafts 20 and 21 are mounted respectively two straight-tooth spur wheels 22 and 23 having such a broad face width that each constitutes, in effect, a cluster of two like wheels. These wheels are in constant mesh with each other over slightly less than one-half of their face width, so that the output shafts are driven in opposite directions of rotation. The input shaft 24 carries a slidable sleeve 25 constrained by splines or keys 26 to rotate with it, and on this sleeve are rigidly fixed a forward driving pinion 27 and a reverse driving pinion 28, these pinions being of the same diameters and having a relatively narrow face width. Control means, consisting of a striking yoke 29 cooperating with a groove 30 in the sleeve 25, are provided for sliding the sleeve along the input shaft 24 between forward and reverse positions through the neutral position in which it appears in Fig. 1. When the sleeve 25 is in the forward position, the pinion 27 is in mesh with the part of the face width of the wheel 22, that is not in constant mesh with part of the wheel 23, and the pinion 28 is spaced behind the wheel 23. When the sleeve 25 is in the reverse position, the pinion 28 is in mesh with the part of the face width of the wheel 23, that is not in constant mesh with part of the wheel 22, and the pinion 27 is spaced in front of the wheel 22. The wheels 22 and 23 are coupled to the shafts 20 and 21 by coupling devices 34 and 35, the object and nature of which will be hereinafter described with reference to corresponding devices 34A and 35A shown in Fig. 3.

Figure 3:
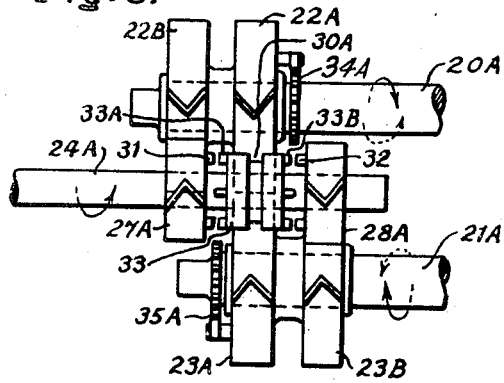
Figure 4:
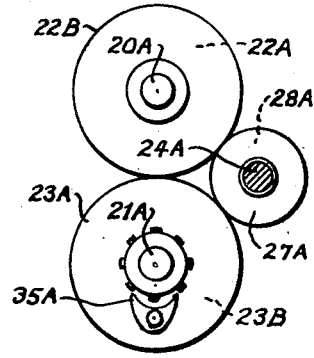

It is generally preferable in practice to employ a construction in which the pinions are also in constant mesh respectively with the wheels with which they co-operate and are associated with clutches whereby they can be alternatively clutched to the input shaft. An embodiment of the improved gearing having this feature is shown in Figs. 3 and 4, the gearing being suitable for driving two axles of a railway vehicle from a single internal-combustion engine. For convenience of description it will be assumed that the single input shaft 24A projects through the "front" of the gear casing and the two output shafts 20A and 21A project through the "rear." Two double-helical gear wheels 22A and 23A of the same diameter are mounted respectively on the two output shafts and are in constant mesh with each other. A forward driving double-helical gear wheel 22B is mounted on the first output shaft 20A near the front of the gearing, forming with the gear wheel 22A a cluster of two wheels rigidly coupled together. A reverse driving double-helical gear wheel 23B is mounted on the second output shaft 21A near the rear of the gearing, forming with the gear wheel 23A a second cluster of two wheels rigidly coupled together. The two wheels of each cluster may be of the same diameters, as shown. A forward driving pinion 27A rotatable on the input shaft 24A is in constant mesh with the gear wheel 22B, and a reverse driving pinion 28A is in constant mesh with the gear wheel 23B. The pinions 27A and 28A may be of the same diameter and the gear wheels 22B and 23B also of the same diameter, as shown, in which case the gear ratio will be the same on forward drive as on reverse. The pinions 27A and 28A are provided with jaw-clutch teeth 31 and 32 respectively, and a jaw-clutch member 33 having corresponding jaw-clutch teeth 33A and 33B at its ends is slidably splined to the input shaft 24A. Control means co-operating with a striking groove 30A are adapted to slide the member 33 into clutching engagement alternatively with the two pinions 27A and 28A, to establish forward and reverse drives.

In a multi-axle drive for a railway vehicle driven by an internal-combustion engine it is convenient to allow each axle to free-wheel independently of the other, so as to avoid the skidding which would occur, if the axles were constrained to rotate in unison, owing to unavoidable slight differences in the diameters of the wheel tires. Accordingly, each of the output shafts is adapted to be coupled to its driving gearing by unidirectional coupling means adapted in alternative conditions to transmit torques in opposite senses. Such unidirectional coupling means may take the form of an invertible unidirectional coupling device associated with a control member which is operatively connected with the reversing control member of the gearing and which is operable to change the conditions of the unidirectional coupling.

In the example shown in Figs. 3 and 4 such invertible unidirectional coupling devices between the output shafts and the gear-wheel clusters thereon are shown diagrammatically at 34A and 35A. Figs. 5 and 6 show as an example the construction of the coupling device associated with the output shaft 20A. The cluster that includes the wheel 22A is journalled on this shaft by bushes such as 36 but is prevented from moving axially thereon by thrust rings such as 37. A portion of the shaft 20A behind the cluster is provided with helical splines 38 of steep pitch, say right handed, and on this splined part of the shaft is engaged a nut 39 movable helically on the shaft between the thrust ring 37 and a stop 40 located by snap rings 41. The nut has at its front end a flange 42 bearing on its periphery radially extending jaw clutch teeth 43. A tube 44 rigid with the cluster extends from the rear face of the wheel 22A and has on its interior surface two rings of jaw-clutch teeth 45 and 46 adapted to engage with the teeth 43 on the nut. These rings are spaced apart by a distance slightly exceeding the thickness of the nut teeth. It will be assumed that forward rotation or the first output shaft (denoted by the arrow F) is clockwise as viewed from the front, and consequently the front ring of jaw-clutch teeth 45 will be the reverse-driving teeth and the rear ring 46 the forward-driving teeth. On the front of the flange 42 on the nut one or more spring-loaded pawls 47 are pivotally mounted, having their noses directed clockwise as viewed from the front; these noses project very slightly in front of the clockwise leading faces of the jaw clutch teeth 43 that are respectively adjacent to them. On the rear of the flange 42 one or more spring-loaded pawls 48 are pivotally mounted, having their noses directed counter-clockwise as viewed from the front; these noses project very slightly behind the clockwise trailing faces of the jaw-clutch teeth 43 that are respectively adjacent to them. The nut 39 is movable between the following five positions: first, the nut teeth 43 in front of the teeth 45 and the pawls 48 in the path of the teeth 45; second, the nut teeth 43 engaged with the teeth 45; third, the nut teeth 43 between the two rings of teeth 45 and 46, the pawls 47 in the path of the teeth 45, and the pawls 48 in the path of the teeth 46, as shown; fourth, the nut teeth 43 engaged with the teeth 46; fifth, the nut teeth 43 behind the teeth 46 and the pawls 47 in the path of the teeth 46. On the part of the nut behind the flange is slidably mounted an inverting sleeve 49 provided with a circumferential groove 50 for engagement by a shifting yoke and extending over the rear stop 40, which has the form of a ring rigid with the shaft and having straight keys 51 on its periphery. The sleeve 49 has on its inner surface straight keys 52 slidable in keyways 53 on the exterior of the nut, so that the sleeve is incapable of rotation relatively to the nut. In the rear of the sleeve is a ring of straight keys 54 spaced from the front keys 52 by a distance slightly exceeding the length of the keys 51 on the stop. The two rings of keys 52 and 54 in the sleeve are circumferentially staggered as shown in Fig. 6. The helix angle of the shaft splines 38, and the circumferential spacing and dimensions of the keys are such that, when the sleeve is moved to the front and the nut is in the first (foremost) position, the keys 54 in the sleeve engage between the keys 51 on the stop, there being a circumferential interval between the clockwise leading faces 54A of the keys 54 in the sleeve and the clockwise trailing faces 51B of the keys 51 on the stop. If now the wheel cluster is urged clockwise when viewed from the right of Fig. 5, relatively to the shaft, the ring of jaw-clutch teeth 45 engages a pawl 48 and so screws the nut rearwards and clockwise along the shaft until the nut teeth 43 mesh cleanly with the reverse-driving teeth 45; these interengaged teeth, as the nut passes through its second position, maintain its movement until the pawls 48 engage the ring of jaw-clutch teeth 46, whereby the nut is taken through its third position and its teeth 43 are caused to mesh cleanly with the jaw-clutch teeth 46. As the nut attains its fourth position, in which these two sets of jaw-clutch teeth 43 and 46 are fully engaged together, the leading faces 54A of the rear keys 54 in the sleeve abut the trailing faces 51B of the keys 51 on the stop and so prevent further screwing of the nut 39 along the shaft 20A. The coupling accordingly picks up the forward drive. If the shaft begins to over-run the gear-wheel cluster in the clockwise direction, the nut is automatically screwed back by the jaw-clutch teeth, assisted by the pawls 47, to its first position, and the coupling thus free-wheels without restraint.

In a similar way, when the inverting sleeve 49 is moved to the rear and the nut is in the fifth (rearmost) position the front ring of keys 52 in the sleeve engage between the keys 51 on the stop, there being a circumferential interval between the counter-clockwise leading faces 52B of the keys 52 in the sleeve and the counter-clockwise trailing faces 51A of the keys 51 on the stop. If now the wheel cluster is urged counter-clockwise relatively to the shaft, the nut is screwed forwards along the shaft by the action of the jaw-clutch teeth, assisted by the pawls 47, until the nut attains its second position, with its teeth 43 fully in engagement with the ring of reverse-driving jaw-clutch teeth 45, whereupon the inverting sleeve 49 prevents further rotation of the nut on its shaft, since the said circumferential interval between the keys 52 in the sleeve and the keys 51 on the stop has been fully taken up. If the shaft tends to over-run the cluster in the counter-clockwise direction, the nut is automatically screwed back by the jaw-clutch teeth, assisted by the pawls 48, to its fifth position and the coupling thus free-wheels without restraint. Invertible synchro-coupling mechanism of this kind is more fully described in Patent No. 2,202,271.

The striking yokes 55 and 56 (Fig. 7) controlling the inverting sleeves of the two invertible couplings 34A and 35A of the gearing are interconnected through spring-link connections with the yoke 57 controlling the slidable jaw-clutch element 33. A shifting rod 58 is slidable in bearings 59 and 60 in the gear casing between three positions determined by a spring-loaded plunger 61 cooperating with notches F, N and R in the rod 58. These notches correspond to forward, neutral and reverse conditions of the gearing respectively. The striking yoke 57 is rigid with the rod 58, while each of the yokes 55 and 56 is slidable on the rod 58 to a limited extent on each side of a normal position thereon in which it appears in Fig. 7, against a restoring force imposed by compression springs 62 and 63. The spring 62 reacts on the yoke 57 and acts on a sliding stop consisting of a diametrically split washer 65 retained in a cup washer 66 and operating in an annular groove 67 in the rod 58. The spring 63 reacts on an abutment collar 64 rigid with the rod 58 and acts on a sliding stop arranged similarly to that already described.

In an alternative arrangement of the improved gearing shown in Figs. 8 and 9, the first output shaft 20C is provided with a gear wheel 22C in constant mesh with an idler wheel 68 on a fourth shaft 69, the wheel 68 also being in constant mesh with a gear wheel 23C on the second output shaft 21C. The gear wheels 22C and 23C may have the same diameter, as shown, so that the shafts 20C and 21C are adapted to be driven at equal speeds in the same direction. On the input shaft 24C is journalled a forward-driving pinion 27C in constant mesh with the idler wheel 68. A reverse-driving wheel 23D is rigid with the wheel 23C and is in constant mesh with a reverse-driving pinion 28C journalled on the input shaft 24C. The ratio of the diameter of the pinion 27C to that of the gear wheels 22C and 23C may be the same as the ratio of the diameter of the pinion 28C to that of the wheel 23D, as shown, so that the speed ratios of the gearing are the same on forward and reverse drives. The two pinions 27C and 28C are provided respectively with jaw-clutch teeth 31C and 32C adapted to engage respectively jaw-clutch teeth 33D and 33E on the ends of a slidable jaw-clutch member 33C constrained to rotate with the input shaft 24C, whereby these pinions can be coupled alternatively to the input shaft. The wheel cluster 23C and 23D and the wheel 22C are coupled to the shafts 21C and 20C respectively by invertible unidirectional coupling means denoted diagrammatically at 35C and 34C; these means may be of the kind hereinbefore described with reference to Figs. 5 and 6.

It is to be understood that the word "cluster" used herein includes, where the context allows, a gear wheel such as is shown in Fig. 1, which has a relatively wide tooth face, which is so arranged that it meshes with two different gear wheels over respectively different parts of its face width and which consequently constitutes in effect a cluster of two like wheels.

I claim:

1. A drive-dividing reversing transmission having an input shaft, two reversible output shafts, forward-driving and reverse-driving gearing for connecting said input shaft to said output shafts, two controllable unidirectional coupling devices for coupling said output shafts respectively to said gearing, each of said devices being capable in alternative conditions of transmitting torques in opposite senses, and control means operable for selecting forward and reverse drives in said gearing and for changing the condition of said unidirectional coupling devices.

2. A drive-dividing reversing transmission having an input shaft, two reversible output shafts, forward-driving gearing and reverse-driving gearing for connecting said input shaft to said output shafts, selecting means operable for establishing alternatively forward and reverse drives in said gearing, two unidirectional coupling devices for coupling said output shafts respectively to said gearing, each of said coupling devices having an inverting member operable for reversing the unidirectional drive transmitting capacity of the coupling device, and a common control member co-acting with said selecting means and with said inverting members in such a manner that said coupling devices are put in condition to transmit the drives established by operation of said selecting means.

3. A drive-dividing reversing transmission having an input shaft, two reversible output shafts, forward-driving gearing and reverse-driving gearing for connecting said input shaft to said output shafts, selecting means operable for establishing alternatively forward and reverse drives in said gearing, two unidirectional coupling devices for coupling said output shafts respectively to said gearing, each of said coupling devices having an inverting member operable for reversing the unidirectional drive transmitting capacity of the coupling device, a control member cooperating with said selecting means, biasing means associated with said inverting members, and operative connections between said biasing means and said control member.

4. In a drive-dividing transmission having an input shaft, two output shafts, and forward and reverse driving gearing for connecting said input shaft to said output shafts, the combination with each of said output shafts and said gearing of a coupling device having two main power transmitting elements adapted to be coupled together in reversible unidirectional driving relationship, an intermediate member having jaw-clutch teeth, two sets of jaw-clutch teeth on one of said elements, said intermediate member being constrained to move helically with respect to the other of said elements between a first position in which its teeth are in front of one of said sets of teeth and a fifth position in which its teeth are behind the other of said sets of teeth, passing successively through a second position in which its teeth are in mesh with said one set of teeth, a third position in which its teeth are between said sets of teeth, and a fourth position in which its teeth are in mesh with said other set of teeth, at least two pawls on said intermediate member for co-operation with teeth of said one element to effect smooth engagement of said jaw-clutch teeth as said intermediate member enters said second and fourth positions, and an inverting control member which is associated with said intermediate member for limiting the helical movement thereof, which in one condition prevents said intermediate member from passing from said fourth to said fifth position, and which in another condition prevents said intermediate member from passing from said second to said first position.

5. A drive-dividing reversing gearing including a driving shaft, a forward-driving gear wheel and a reverse-driving gear wheel co-axial with said shaft, selecting clutch means for connecting said wheels alternatively to said shaft, a pair of output shafts disposed parallel to said input shaft, two gear-wheel clusters co-axial with said output shafts respectively, one wheel of one of said clusters meshing with said forward-driving wheel, one wheel of the other of said clusters meshing with said reverse-driving wheel, and another wheel of one of said clusters meshing with another wheel of the other of said clusters, two unidirectional coupling devices for connecting said clusters respectively to said output shafts, each of said coupling devices having an inverting member operable for changing its torque-transmitting capacity from forwards to reverse, and a common control member for said selecting clutch means and said inverting members.

HAROLD SINCLAIR.